(12) United States Patent
Bozek et al.

(10) Patent No.: US 8,332,490 B2
(45) Date of Patent: Dec. 11, 2012

(54) METHOD, APPARATUS AND PROGRAM PRODUCT FOR PROVISIONING A COMPUTER SYSTEM

(75) Inventors: James J. Bozek, Bothell, WA (US); Kellie Francis, Cary, NC (US); Edward Stanley Suffern, Chapel Hill, NC (US); James Lee Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/422,441

(22) Filed: Apr. 13, 2009

(65) Prior Publication Data

US 2010/0262815 A1 Oct. 14, 2010

(51) Int. Cl.
*G06F 15/177* (2006.01)
(52) U.S. Cl. ........................................ 709/220
(58) Field of Classification Search ........... 709/220–222
See application file for complete search history.

(56) References Cited

U.S. PATENT DOCUMENTS

| | | | |
|---|---|---|---|
| 7,246,168 B1 | 7/2007 | Bales | |
| 7,246,173 B2 | 7/2007 | Le et al. | |
| 7,379,429 B1 | 5/2008 | Thottakkara | |
| 7,418,486 B2 | 8/2008 | Brubacher et al. | |
| 7,802,084 B2 * | 9/2010 | Fitzgerald et al. | 713/2 |
| 2002/0016817 A1 | 2/2002 | Offer | |
| 2002/0073201 A1 * | 6/2002 | French et al. | 709/227 |
| 2004/0199758 A1 * | 10/2004 | Meaney et al. | 713/2 |
| 2004/0249907 A1 | 12/2004 | Brubacher et al. | |
| 2004/0249975 A1 | 12/2004 | Tuck et al. | |
| 2005/0149924 A1 * | 7/2005 | Komarla et al. | 717/176 |
| 2006/0047946 A1 * | 3/2006 | Keith, Jr. | 713/2 |
| 2006/0069801 A1 | 3/2006 | Rich et al. | |
| 2006/0200539 A1 * | 9/2006 | Kappler et al. | 709/220 |
| 2007/0180052 A1 | 8/2007 | Zomaya | |
| 2007/0214348 A1 * | 9/2007 | Danielsen | 713/2 |
| 2008/0046548 A1 * | 2/2008 | Doran et al. | 709/222 |
| 2008/0195640 A1 * | 8/2008 | Iszlai et al. | 707/100 |
| 2008/0209019 A1 * | 8/2008 | Iszlai et al. | 709/222 |
| 2009/0132683 A1 * | 5/2009 | Furuyama et al. | 709/220 |
| 2010/0107155 A1 * | 4/2010 | Banerjee et al. | 717/177 |

* cited by examiner

*Primary Examiner* — Shirley Zhang
(74) *Attorney, Agent, or Firm* — Tom Tyson; Daniel E. McConnell

(57) ABSTRACT

A method, apparatus and program product for automatically detecting the configuration of a hardware platform, generating the communications necessary to request the correct OS for the platform, authenticating the request at a remote server, detecting the image class based on a class node policy, and downloading the correct OS to the requesting platform while avoiding any necessity of inventorying or entering node-specific information such as a MAC (Media Access Control) address or UUID (Universally Unique Identifier).

6 Claims, 6 Drawing Sheets

| TAG NAME | TAG # | LENGTH | TYPE | DATA FIELD | |
|---|---|---|---|---|---|
| CLIENT MACHINE IDENTIFIER (UUID) | 97 & 61 | 17 | TYPE {1} = 0 | UUID (16) | REQUIRED NOTE #1 |
| CLIENT NETWORK INTERFACE IDENTIFIER | 94 | 3 | TYPE {1} = 1 | UNDI - MAJOR VER(1), MINOR VER(1) | |
| CLIENT SYSTEM ARCHITECTURE | 93 | 2 | | 0 = IA x86 PC(2)<br>1 = NEC/PC98(2)<br>2 = IA64 PC.(2)<br>3 = DEC ALPHA (2)<br>4 = ARCX86 (2)<br>5 = INTEL LEAN CLIENT (2) | |
| PARAMETER REQUEST LIST | 55 | VARIES | THIS PARAMETER REQUEST LIST IS THE MINIMUM THAT MUST BE IMPLEMENTED BY PXE BASE-CODE OPTION ROMS. SUBNET(1), ROUTER(3), VENDOR(43), CLASS(60) VENDOR OPTIONS (128 THROUGH 135) | | REQUIRED |
| CLASS IDENTIFIER | 60 | 32 | "PXECLIENT:ARCH:xxxxx:UNDI:yyyzzz" - USED FOR TRANSACTIONS BETWEEN CLIENT AND SERVER.<br>"PXESERVER" - USED FOR TRANSACTIONS BETWEEN SERVERS (THESE STRINGS ARE CASE SENSITIVE. THIS FIELD MUST NOT BE NULL TERMINATED.)<br>THE INFORMATION FROM TAGS 93 AND 94 IS EMBEDDED IN THE CLASS IDENTIFIER STRING<br>xxxxx = CLIENT SYS ARCHITECTURE 0 - 65535<br>yyy = UNDI MAJOR VERSION 0 - 255<br>zzz = UNDI MINOR VERSION 0 - 255<br>DELIMITER IS ":" (COLON) | | REQUIRED |

FIG. 2

METHOD, APPARATUS AND PROGRAM PRODUCT FOR PROVISIONING A COMPUTER SYSTEM

FIELD AND BACKGROUND OF INVENTION

This invention relates to the loading of operating system software into computer system hardware from a server accessible over a network.

Today, there are a number of systems that support loading of different operating system software from a remote server. Specifically, a single hardware platform can support a virtualized environment in which a number of virtualized operating systems support a number of users requiring identical operating systems and applications or that same platform can support a single high performance connection to a single operating system (hereinafter the phrases "operating system" or "operating system software" will be represented by the abbreviation OS) and a single high performance application. The last mentioned operation is particularly true in a rack environment in which a plurality of hardware platforms function as nodes in a network.

SUMMARY OF THE INVENTION

With the foregoing in mind, what is required is a system class image detection mechanism which will auto-classify various OS requests from multiple nodes and assign an OS request to a class node policy in an image boot server. This classification is characterized by the different configurations of the same base architecture. What follows describes a method, apparatus and program product for automatically detecting the configuration of a hardware platform, generating the communications necessary to request the correct OS for the platform, authenticating the request at a remote server, detecting the image class based on a class node policy, and downloading the correct OS to the requesting platform while avoiding any necessity of inventorying or entering node-specific information such as a MAC (Media Access Control) address, UUID (Universally Unique Identifier) or VPD (Vital Product Data).

BRIEF DESCRIPTION OF DRAWINGS

Some of the purposes of the invention having been stated, others will appear as the description proceeds, when taken in connection with the accompanying drawings, in which:

FIG. 2 is a representation of the format used by a preboot execution environment message;

DETAILED DESCRIPTION OF INVENTION

Figure 1:
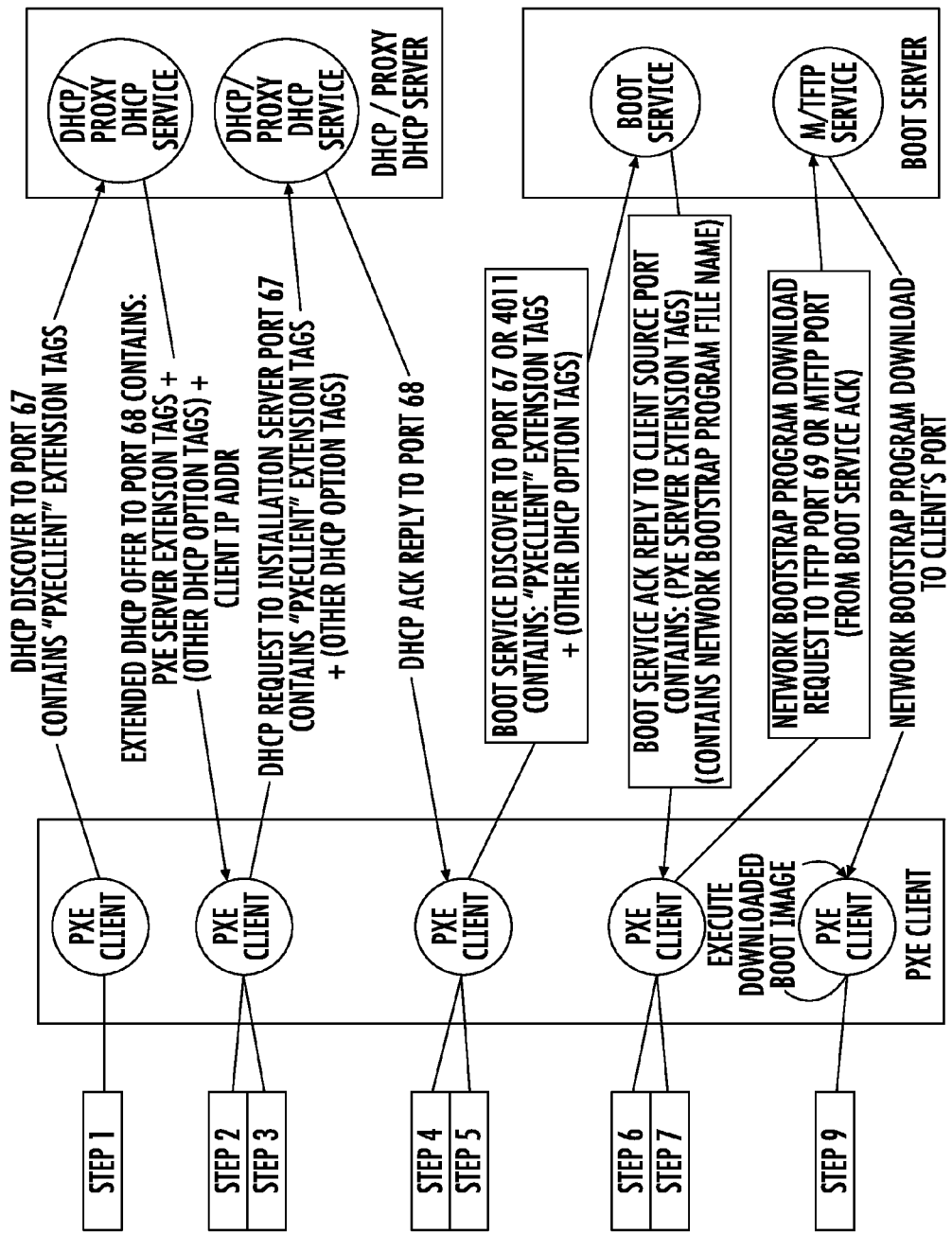
FIG. 1 is a representation of the flow of processes in a preboot execution environment.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Today an Information Technology (IT) administrator is required to obtain the Media Access Control (MAC) address of a newly installed computer system and then manually enter both the MAC address and Internet Protocol (IP) address of that node in a remote Pre-boot Execution Environment (PXE) boot server. This information is manually obtained from an external tag, sometimes called a "toe tag", attached to the computer. Once this information is entered at the remote PXE boot server, the local computer is powered on. The Ethernet Network Interface Card (NIC) uses the PXE boot protocol to access a remote boot image and down load that image. This operation is tedious in an environment consisting of rack on rack of computer systems.

This invention provides a method of obtaining the hardware configuration of the newly installed computer, including the MAC and IP addresses. The inventive method allows initial detection and determination of the class of operating system to be loaded based on the hardware configuration contained in the VPD. Use of the current PXE boot interface and architecture allows different classes of operating systems to be loaded based on VPD. Also, automatic modification of the class of operating system is provided if the customer changes the hardware configuration. Hardware configurations are BIOS independent. The environment may be easily scaled.

Implementations contemplated by this invention provide for base board management (BMC) to communicate information to the BIOS and request the remote boot of a preboot execution environment and specific class of operating system. Further, for transmission of the Internet Protocol Suite, commonly known as Transmission Control Protocol/Internet Protocol (TCP/IP) packets through an Ethernet NIC to a PXE boot server to request the loading of a preboot execution environment and specific class of operation system. Further, for the PXE boot server to authenticate the request to ensure the correct operating system is loaded. And further for the PXE server to auto-classify the requesting node and automatically detect the image class required by the requestor.

As will be understood, this disclosure deals with the remote network loading of a preboot execution environment and an operating system from centralized servers. Specifically, this disclosure deals with the identification of a class of servers. Once this class is identified by a base board management controller (BMC) query of the system configuration, this information is communicated to the BIOS in the Pre-boot Execution Environment (PXE Boot). The PXE boot process then allows the BIOS to communicate class parameters to a boot server so it can remotely download one of "n" operating systems. This disclosure discusses two classes of operating systems, but can easily be expanded to "n". The diagram of FIG. 1 shows the basic flow of the PXE boot protocols.

This disclosure relates to a PXE Client to Boot Service aspect in which the hardware node specifies the class type of download required. Specifically what is disclosed here is an automated way to communicate with a network bootstrap program (NBP) to tell the NBP whether it is desired to boot a bare metal OS subsequently booted or whether a hypervisor is to be subsequently booted. This allows administrators that manage central provisioning servers that house NBPs to communicate with and to deploy operating systems, perform diagnostics, or manage disk deployment. Today, the bulk (or potentially all) of the NBP based solutions do all their decision making on the servers with which NBPs communicate. What is taught here is moving a key decision making policy to the device (provisioning server) on which the NBP runs. More specifically, this disclosure teaches an addition to Step 9 in FIG. 1 in which a client device communicates hardware parameters to the NBP's provisioning server and the NBP remotely deploys the correct bare metal OS or hypervisor plus virtual machine OS's based on a provisioning policy.

Prior to Step 1 in FIG. 1, the BMC identifies the class of operational software required. Steps 5 through 9 depict the process that this disclosure enhances. Network boot steps following step 9 in FIG. 1 automate the selection of the operating system to be loaded across a network from a provisioning server. In this architecture, there is a tag for the operation class configuration identifier. What is described herein is a method of automatically modifying the configuration class tag identifier to load a specific operating system. The Universal Unique Identification (UUID) is not required for this operation.

There are a number of prior patents that deal with PXE boot services to which the interested reader may be referred. Among them are U.S. Pat. Nos. 7,313,690 and 7,194,619 that deal with authentication, U.S. Pat. No. 7,297,354 that deals with a secure network boot, U.S. Pat. No. 7,290,258 that deals with booting the same image to multiple devices, U.S. Pat. No. 7,284,120 that deals with loading an image during the manufacturing process and U.S. Pat. No. 7,159,018 that deals with loading an image based on a manufacturing script. U.S. Pat. No. 7,293,168 invokes the use of a UUID to provide a boot image.

Linux provides a type of boot service called PXELinux that searches for its configuration file on the boot server and loads the appropriate application files. However, this is a two-step process actually requiring manual intervention as described in the following link: http://syslinux.zytor.com/pxe.php. The initial step of this process is for the user to load a diskette image of the application required. To use PXELinux, the user completes a checklist of the required applications. These options are then loaded on a diskette. This diskette image is user-defined based on the system configuration and the applications required. This manual input is done during the BIOS boot-up process. Once completed and configured by the user, PXELinux then requests the application images from a Boot Server.

In this invention, the message exchange follows the protocol described above, but is user independent. The format shown in FIG. 2 is used by the PXE Boot to request certain type of applications. Note that this is an abbreviated form of the formatted message.

In accordance with this invention, the OS boot architecture is modified to include two additional requested architectured parameters. Unlike what is fixed in PXE Base-Code option ROMs or input by a user, the base board management controller (BMC) determines the hardware configuration and passes that configuration to the BIOS during the initial program load (IPL) process. This operation defines the class of operation service. This flexibility allows a user to boot with one operating system and then modify that operating system when a hardware update is needed.

The client system architecture field is used to denote the system architecture, such that the appropriate PXE loader can be loaded, not what operating system to be loaded (Microsoft Windows cannot be PXEbooted). This disclosure shows that this structure can be used as a possible implementation to pass the system classification. Adding a new type field or parameter to an existing field to the client system architecture would require minor modifications to the boot loader, such that it knows what to request when it requests the operating system to load from the higher level provisioning server. One possible implementation is to define a tag name in the PXEClient data structure such as "NBP vendor specific parameter". This may have certain compatibility issues. However, an extension of the architecture does permit this function to be implemented.

Figure 3A:
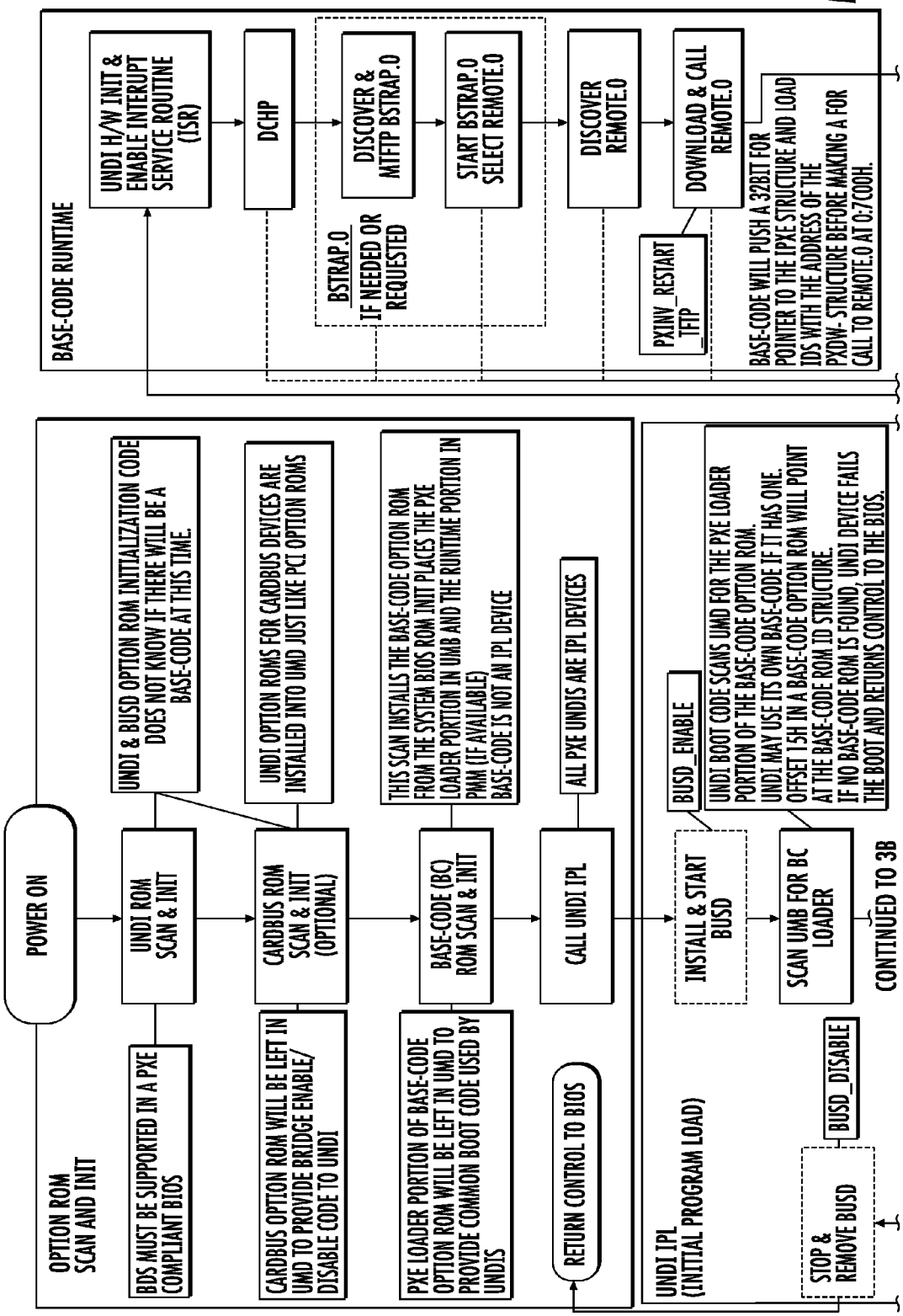
FIG. 3 is a representation of an initial program load process.
Figure 3B:
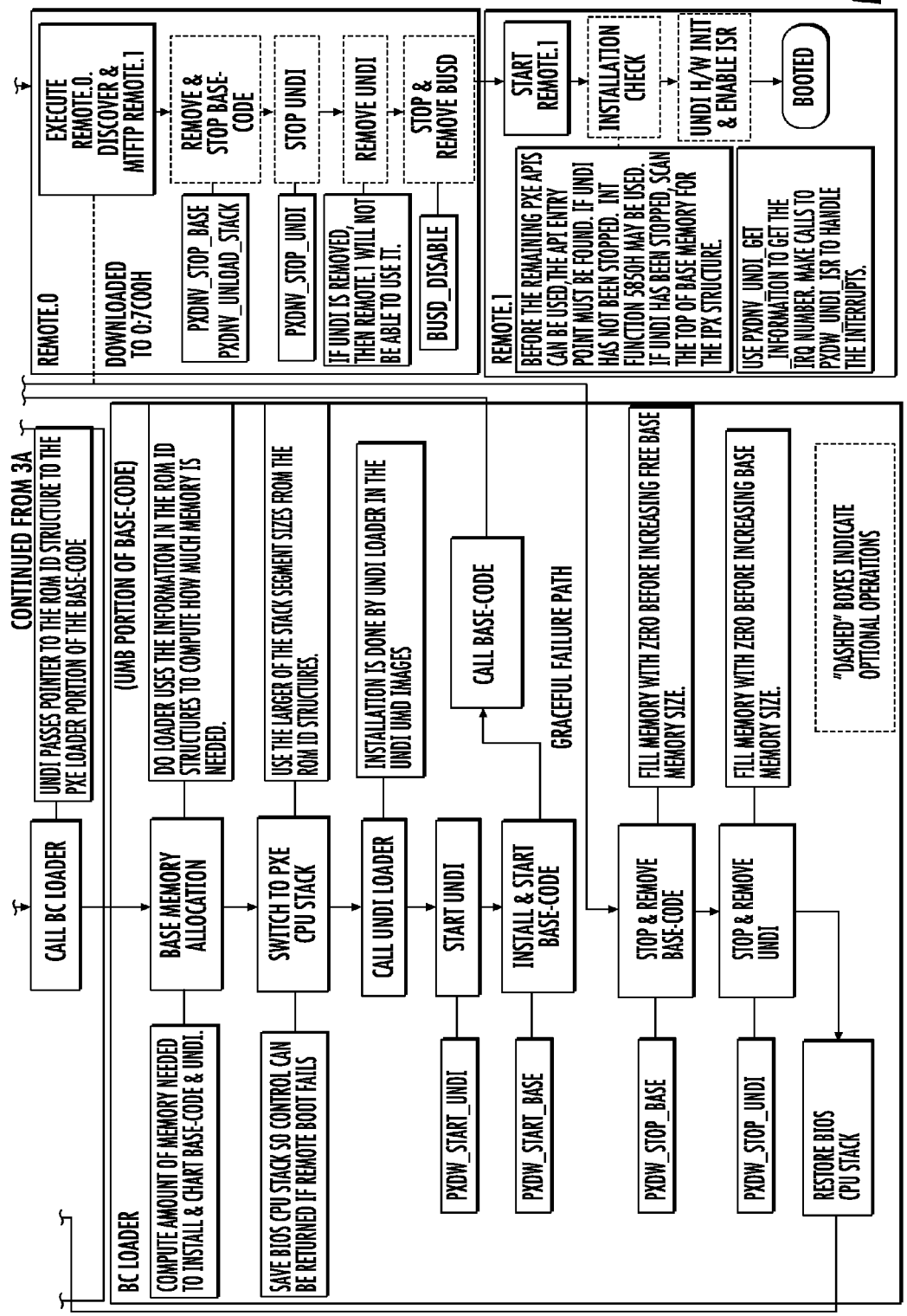

In the case of the iDataPlex Hosted Client, two possibilities exist. The first possibility is the class requirement for a virtual operating system such as Citrix and Xen Hypervisor to be loaded in a virtual environment. The second possibility is for the high resolution Microsoft-compliant operating system to be loaded. The hardware differentiation is provided by the presence or absence of a video compression card. Note that this archstecture is not limited to a specific card or operating system, but can be extended depending on requirements The BMC detects this differentiation requiring no device drivers in the BIOS. The BMC then passes this class operating system configuration parameter to BIOS. During the PXE Boot process, the client system architecture specifies the class type of operating system to load. For example, a code of 6 can specify a Microsoft Vista load whereas a code of 7 specifies a virtual environment in which a virtual operating system environment is loaded. The advantage of this methodology is that the user can either add or remove the hardware requirement after the manufacturing process is complete. This method differentiates the present invention from U.S. Pat. No. 7,293,168 since the UUID is always fixed in that teaching. FIG. 3 shows the IPL process from the power-on of the system.

Figure 4:
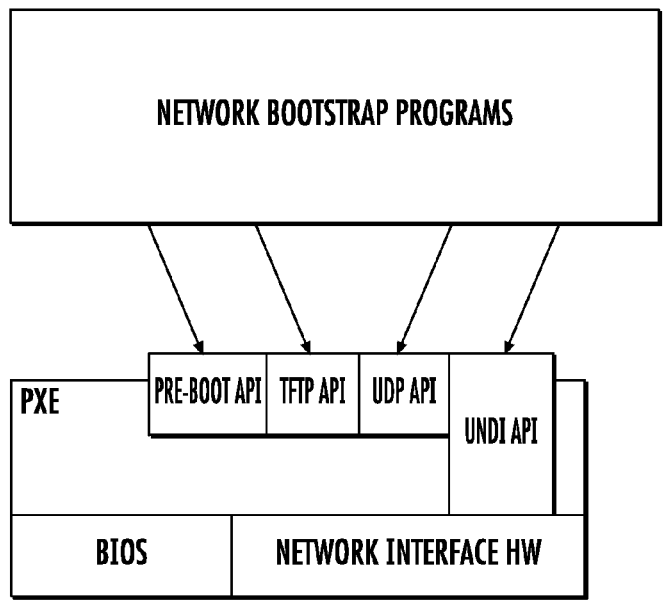
FIG. 4 is a representation of layers of code in a computer system hardware platform.

BIOS base code is stored in EEPROM in the system prior to the actual operating system image load. See FIG. 4 for a representation of stored program layers. BIOS communicates with the BMC to determine the hardware configuration and therefore, the class operating system type. This allows a remote boot without any intervention. Once the class is determined, this parameter is passed to the PXE Boot server. The PXE Boot server then loads the PXE and class operating system correlating it to the MAC address and the UUID specified as part of the PXE Boot protocol. These parameters are then passed to the Application Program Interface (API) and the transfer occurs. The operation of this invention is independent of the transfer mechanism.

Figure 5:
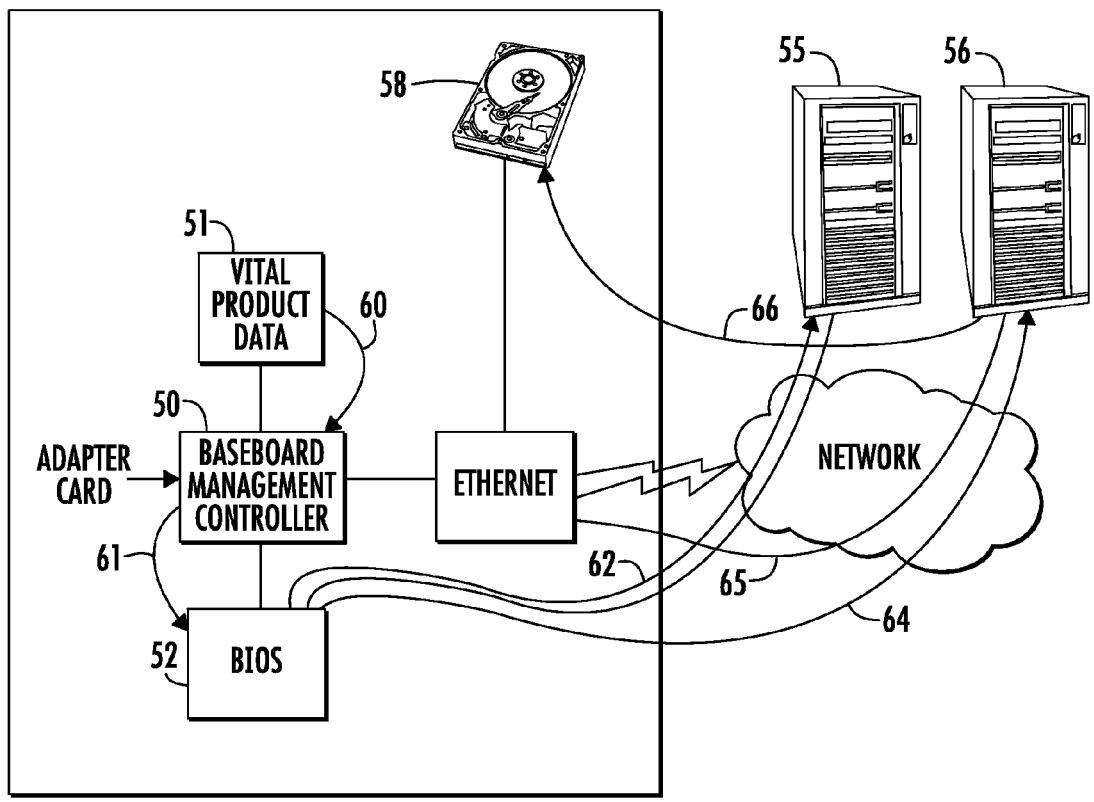
FIG. 5 is an illustration of the interactions and interconnections of computer system hardware platform elements and network resources in implementing this invention.

Referring now to FIG. 5, When standby power is applied to the system, shown in steps 1 & 2 of FIG. 1 above, the BMC 50 reads the VPD 51 and the hardware configuration as indicated by a line 60. This information is passed to BIOS 52 as indicated by a line 61 to determine the class of operating system required. BIOS 54 then sends a Dynamic Host Controller Protocol (DHCP) request to the DHCP server 55 as indicated by a line 62. This request returns the IP address of the PXE boot server. BIOS then passes the request for the class of operating system to the PXE Boot server 56, as indicated by a line 64, which is passed to the API, indicated by a line 65, as is done according to prior art. The correct class of operating system is then sent to the iDataPlex Hosted Client product. Shown in this example is the loading of a hard disk 58, indicated by a line 66. However, this operation can be performed in a diskless environment.

Figure 6:
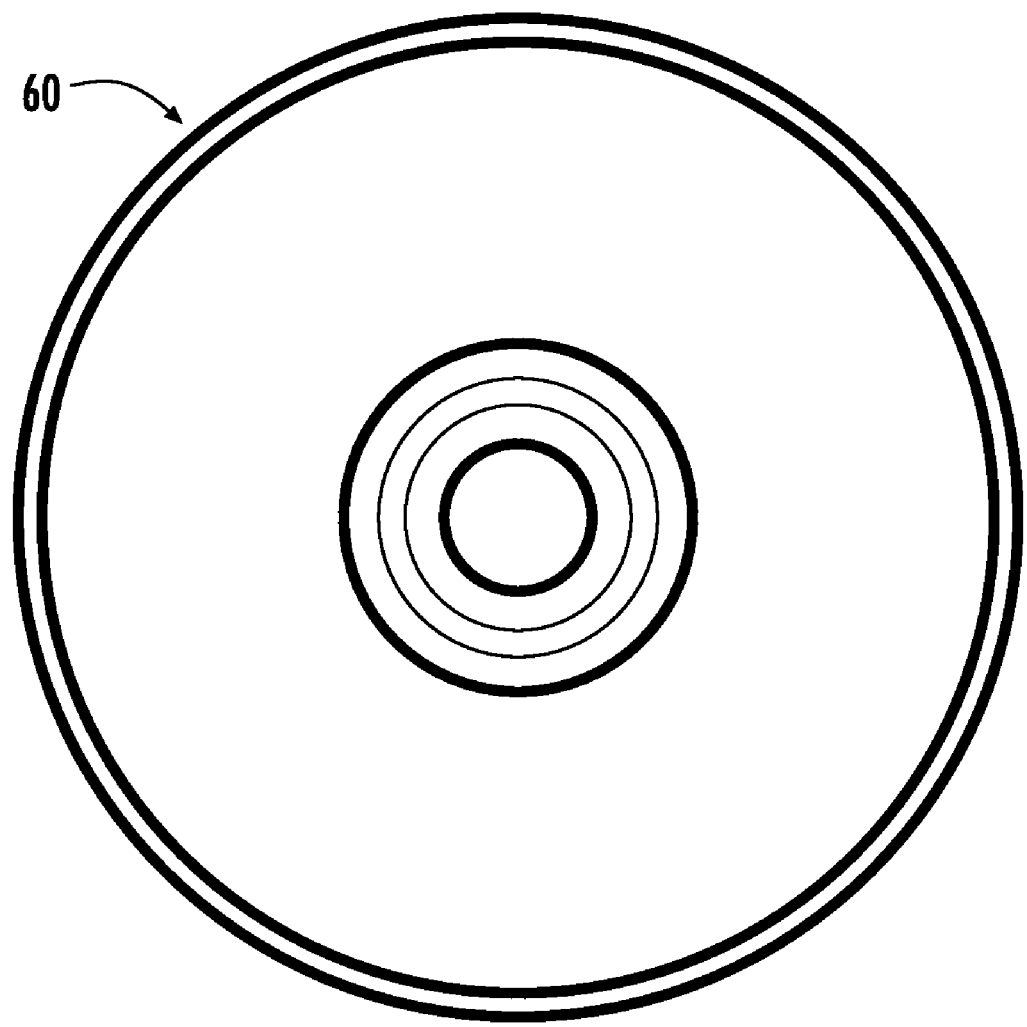
FIG. 6 is a representation of a computer readable medium on which may be stored program code efective, when executing, to implement this invention.

FIG. 6 shows a computer readable medium (here, an optical disk) 60 storing executable programming code in accordance with this invention which, when executed by a computer system hardware platform which has a plurality of elements including a memory element which stores executable program code and a base board management controller component, is effective to practice the methods described here.

In the drawings and specifications there has been set forth a preferred embodiment of the invention and, although specific terms are used, the description thus given uses terminology in a generic and descriptive sense only and not for purposes of limitation.

What is claimed is:

1. A method of providing operating system software to a computer system hardware platform which has a plurality of elements including vital product data, an adapter card, BIOS software, a memory element which stores executable program code, and a baseboard management controller component, the method comprising:
   exercising the baseboard management controller in response to application of standby power to gather from the vital product data and the adapter card data identifying the hardware configuration of the hardware platform and supply the gathered data to the baseboard management controller and the BIOS;
   formulating the identifying hardware platform data to include a class identifier field denoting a corresponding preboot execution environment and specific operating system;
   communicating from the baseboard management controller to the BIOS and to a dynamic host configuration protocol server the formulated identifying data to obtain a network address for an appropriate network bootstrap server;
   communicating from the hardware platform to the appropriate network bootstrap server the formulated identifying data of the hardware platform; and
   providing from the network bootstrap server the preboot execution environment and operating system corresponding to the class identifier in the identifying data.

2. A method according to claim 1 wherein the exercising of the baseboard management controller comprises polling the plurality of elements of the computer 3 system hardware platform.

3. An apparatus comprising:
   a computer system hardware platform having a plurality of elements including vital product data, an adapter card, BIOS software, a memory element which stores executable program code, a base board management controller component, and a network interface controller;
   said baseboard management controller responding to application of standby power by: gathering from the vital product data and said adapter card data identifying the hardware configuration of the hardware platform; formulating the identifying data to include a class identifier field denoting a corresponding preboot execution environment and specific operating system; and supplying the formulated identifying data to said BIOS;
   said network interface controller responding to the application of standby power to said hardware platform by communicating from said hardware platform BIOS to a dynamic host configuration protocol server the formulated identifying data to obtain a network address for an appropriate network bootstrap server;
   said network interface controller communicating from said hardware platform to the appropriate network bootstrap server the formulated identifying data of the hardware platform; and
   said network interface controller receiving from the network bootstrap server a preboot execution environment and operating system which corresponds to the class identifier in the identifying data.

4. An apparatus according to claim 3, wherein said management controller when exercised polls the plurality of elements of the computer system 3 hardware platform.

5. A program product comprising:
   a tangible, non-transitory computer readable media storing digital, executable programming code;
   said stored code effective, when executed by a computer system hardware platform which has a plurality of elements including vital product data, an adapter card, BIOS software, a memory element which stores executable program code and a base board management controller component, to cause a processor of the hardware platform to;
   exercise the baseboard management controller in response to application of standby power to gather from the vital product data and the adapter card data identifying the hardware configuration of the hardware platform and supply the gathered data to the baseboard management controller and the BIOS;
   formulate the identifying data to include a class identifier field denoting a corresponding preboot execution environment and specific operating system;
   communicate from the BIOS to a dynamic host configuration protocol server the formulated identifying data to obtain a network address for an appropriate network bootstrap server;
   communicate from the hardware platform to the appropriate network bootstrap server the formulated identifying data of the hardware platform; and
   provide from the network bootstrap server the preboot execution environment and specific operating system corresponding to the class identifier in the identifying data.

6. A program product according to claim 5 wherein the exercise of the management controller comprises polling the plurality of elements of the computer system hardware platform.

* * * * *